US008880520B2

(12) United States Patent
Gulik et al.

(10) Patent No.: US 8,880,520 B2
(45) Date of Patent: Nov. 4, 2014

(54) SELECTIVELY ADDING SOCIAL DIMENSION TO WEB SEARCHES

(75) Inventors: Tom Gulik, South San Francisco, CA (US); Arun Shankar Iyer, Bangalore (IN); Prasenjit Sarkar, Santa Clara, CA (US); Vinay Kakade, Sunnyvale, CA (US); Erwin Tam, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 377 days.

(21) Appl. No.: 12/764,818

(22) Filed: Apr. 21, 2010

(65) Prior Publication Data

US 2011/0264648 A1   Oct. 27, 2011

(51) Int. Cl.
*G06F 17/30* (2006.01)

(52) U.S. Cl.
USPC ......................................................... 707/732

(58) Field of Classification Search
CPC ................... G06F 17/30867; G06F 17/30749; G06F 17/30761; G06F 17/30035; G06F 17/30864; G06F 17/30899
See application file for complete search history.

(56) References Cited

U.S. PATENT DOCUMENTS

| | | | | |
|---|---|---|---|---|
| 7,756,887 | B1 * | 7/2010 | Haveliwala | 707/769 |
| 7,877,404 | B2 * | 1/2011 | Achan et al. | 707/768 |
| 7,895,193 | B2 * | 2/2011 | Cucerzan et al. | 707/721 |
| 7,895,223 | B2 * | 2/2011 | Toebes | 707/758 |
| 8,024,328 | B2 * | 9/2011 | Dolin et al. | 707/723 |
| 8,121,999 | B2 * | 2/2012 | Hansen et al. | 707/706 |
| 8,195,656 | B2 * | 6/2012 | Grasset | 707/732 |
| 2002/0016786 | A1 | 2/2002 | Pitkow et al. | |
| 2002/0078003 | A1 | 6/2002 | Krysiak et al. | |
| 2005/0165744 | A1 | 7/2005 | Taylor et al. | |
| 2006/0106788 | A1 * | 5/2006 | Forrest | 707/4 |
| 2007/0078822 | A1 | 4/2007 | Cucerzan et al. | |
| 2007/0250488 | A1 | 10/2007 | Lee | |
| 2009/0144264 | A1 * | 6/2009 | Singh et al. | 707/5 |

(Continued)

FOREIGN PATENT DOCUMENTS

| | | |
|---|---|---|
| JP | 2002-366549 A | 12/2002 |
| WO | 2005-089291 A2 | 9/2005 |

OTHER PUBLICATIONS

Web Query Classification, http://en.Wikipedia.org/wiki/Query_classification, Mar. 17, 2008, 5 pages (Accessed Apr. 21, 2010).

(Continued)

*Primary Examiner* — Fred Ehichioya
*Assistant Examiner* — Michelle Owyang
(74) *Attorney, Agent, or Firm* — James J. DeCarlo; Greenberg Traurig, LLP

(57) ABSTRACT

Embodiments are directed towards managing a display of search results by employing a query-classification for a search query to selectively display trust search results that are displayed distinct from non-trust search results. A search query is classified into a query-class. A search is then performed over non-trust sources, and selectively over trust data sources to obtain non-trust and trust search results, respectively. The trust search results are rank ordered based on various categories of search criteria, including, for example, explicit and implicit relationships. Based on the query-class, a different number of trust search results may be displayed. Further, a position for which the trust search results may be displayed may be based on the query-class. Moreover, the non-trust search results displayed distinct or separate from the trust search results to readily distinguish a type of source of the search results.

17 Claims, 7 Drawing Sheets

(56) References Cited

U.S. PATENT DOCUMENTS

| | | | |
|---|---|---|---|
| 2009/0164929 A1* | 6/2009 | Chen et al. | 715/769 |
| 2010/0030734 A1* | 2/2010 | Chunilal | 707/3 |
| 2011/0010366 A1* | 1/2011 | Varshavsky et al. | 707/732 |
| 2011/0184932 A1* | 7/2011 | Hennum et al. | 707/711 |

OTHER PUBLICATIONS

International Search Report and Written Opinion for International Patent Application No. PCT/US2011/033318 mailed Dec. 7, 2011.

* cited by examiner

SELECTIVELY ADDING SOCIAL DIMENSION TO WEB SEARCHES

TECHNICAL FIELD

The present invention relates generally to search queries over a network and, more particularly, but not exclusively to selectively refining a search result based on a user's social network, wherein the social network or trust search results may be selectively displayed distinctly from other non-trust search results based on a query-class and the query-class's number of trust search results to display and position within the display.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, performing a search query for user relevant information still remains cumbrous. Often, the user might have to perform several search queries to obtain relevant search results. Irrelevant search results mean that the user is less likely to find when they are looking for, which in turn may translate into lost opportunities for merchants, or other businesses, to prosper from the user.

Some search engines attempt to improve a search query by modifying the queries based on information obtained from various social networks. For example, some information used to modify the search query may be obtained based on a searcher's address book, buddy list, or the like. However, modifying a search query might actually modify the user's intended search to something other than that which the user had intended. The results therefore, may still remain irrelevant, for not being 'on-point' to a subject for which the searcher may be interested in for a given search. Therefore, many businesses are still attempting to identify new ways to make search results more relevant to the user. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
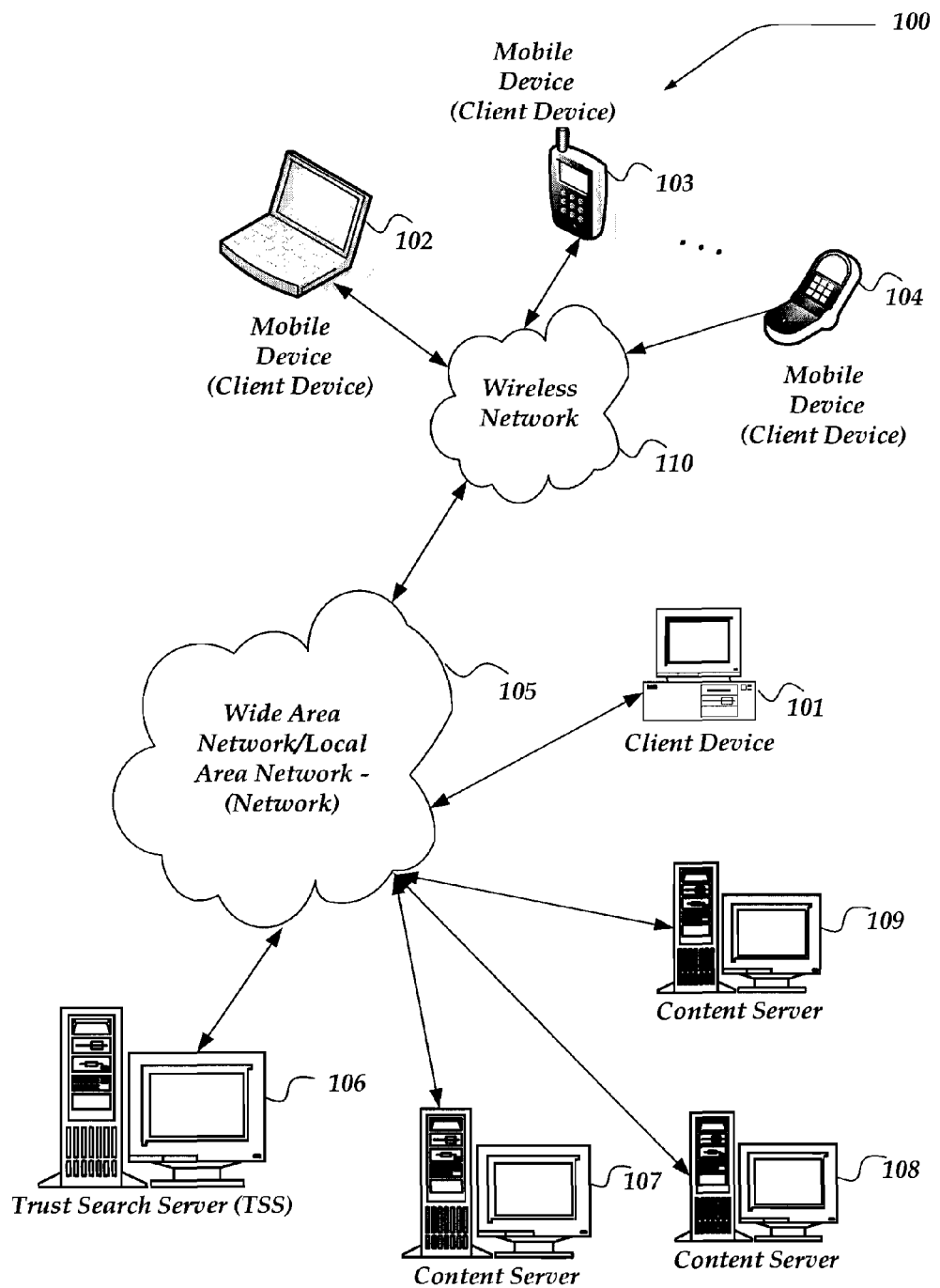
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "social network" refers to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

Social networking information includes various information about communications between the member and other members in the social network, including, but not limited to emails, Short Message Services (SMS) messages, Instant Messaging (IM) messages, Multimedia Message (MMS) messages, alerts, audio messages, phone calls, either received or sent by the member, or the like. Such social networking information may be obtained also from the member's address book, buddy list, or similar sources.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards managing a display of search results by employing a search query-classification to selectively display search results from social networking sites for a search user, called trust search results, which are displayed distinct from other 'non-trust' search results. In one embodiment, a search query is analyzed to classify the search query. Based on the determined query-class, a determination is made of a number and a position in which the trust search results are to be selectively displayed. A search may then be performed over what is termed as non-trust data sources, including, for example, various Internet websites, or the like, for which the search user may not have a social networking relationship. If the query-class indicates searching trust data sources, then the trust data sources, such as social networking sites, messages between users, or the like, are searched to obtain trust search results. The trust search results may then be rank ordered according to and/or within various categories of search criteria. For example, results obtained from explicitly defined data sources (explicit connections), such as friends, family, persons identified in a buddy-list, persons that the search user explicitly follows in various social networking venues, or various defined other webs of trust, may be rank ordered and presented distinct from another category of trust search results. Another category of trust search results might include implicit trust sources (implicit connections) such as social networking sites, clubs, or the like, for which the search user is a member, but, the results are obtained from members other than those that the search user has a direct defined relationship such as a first degree of separation relationship as defined within the search user's buddy-list, address book, or the like. Implicit connections may thus include connections to other persons who may share a same hobby, work at a same company, be part of a same group, or the like.

Still another category of trust search results may include results from various social networking sites for which the search user is not a member, but, it is determined that the results may be relevant to the search query based on a relationship of the source to another source, friend, or the like. For example, such social networking sites might have a friend, family member, co-worker, or the like, as a member. Another example of such trust search results may be groups, businesses, or the like, that have an objective, goal, or the like, that is common to a group, business, or the like, for which the search user is a member. For example, the search user might be a member of a particular scuba club. This category of trust search results may then include other scuba clubs, including those in which a search user's friend, family member, co-worker, or the like, might be a member, or know someone that is a member. This category may be termed, extended implicit connections. Those search results from other networking sites, web sites, or the like, for which there are no explicit or implicit connection to the search user, and the search user has not explicitly identified the source as trusted, would then be herein termed as non-trusted sites, for which non-trust search results may be obtained.

In one embodiment, based on the query-class, a different number of trust search results may be displayed along with non-trust search results. Further, a position for which the trust search results may be displayed in relationship to the non-trust search results may be based on the query-class. In one embodiment, the number and position for displaying the trust search results may be determined by analyzing a plurality of clickthrough rates for search results (both trust search results and non-trust search results) to obtain search users' feedback usable to optimize the number and position for trust search results for each query-class.

In one embodiment, displayed distinct or separate from the trust search results are the non-trust search results. In this manner, separately and distinctly displaying information based on a source's trust level, and by uniquely identifying the trust search results as trust search results, a search user may be able to obtain an increased confidence and relevance in the search results displayed in response to a given search query.

Furthermore, in one embodiment, the search user may select from which social network sites the trust search results are to be obtained from selective display. In one embodiment, a default set of one or more social networking sites may be provided. However, in another embodiment, the search user may also provide one or more additional social networking sites, and/or other sources from which to obtain trust search results for selective display.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Trust Search Server (TSS) 106, mobile devices (client devices) 102-104, client device 101, and content server 107.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content servers 107-109, TSS 106, or the like. In one embodiment, a credential, login username/password, or other information is employed to enable the user access to content at one or more of content servers 107-109, or the like. Such user account, for example, may be configured to enable the user to receive emails, send/receive IM messages, SMS messages, access selected web pages, and/or participate in any of a variety of other social networking activities. However, managing of messages or otherwise participating in other social activities may also be performed without logging into a user account.

In one embodiment, the user of client devices 101-104 may be enabled to access a web page, perform a query search for various content, and/or other perform any of a variety of other activities. For example, client devices 101-104 may enable a user to participate in various social networking sites, such as Twitter, LinkedIn, Facebook, and the like. However, users may participate in a variety of other social networking sites, in addition to, and/or in place of those listed here. Thus, the invention is not to be limited merely based on those social networking sites explicitly identified herein. In any event, those social networking sites for which the user has identified, or the user has an explicit or implicit connection, may be termed as trust data sources. Those other social networking sites, for which the user has neither identified, or has an explicit or implicit connection, are non-trust data sources. Non-trust data sources however, may include other than social networking sites. For example, non-trust data sources might include, but is not limited to, websites hosting dictionaries, downloadable content, businesses, and the like.

In any event, a user of client devices 101-104 may select to perform various search queries over a network, such as networks 105 and/or 110, through TSS 106, for content that might be obtained from, for example, another client device, and/or content servers 107-109. In one embodiment, the user may identify various trust data sources for which to conduct the search. In one embodiment, TSS 106 may determine which trust data sources for which to conduct the search, based in part, on a profile for the user that includes information about the user, user's social networking online activities, and so forth. Results from a search query may then be displayed on the user's client device, where the search results distinctly and uniquely identify search results from trust data sources from search results from non-trust data sources. In one embodiment, a number of trust search results displayed and a position on a display screen with respect to non-trust search results may be based on a query-class for which the search query is determined to belong.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple TSS 106, content servers 107-109, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

One embodiment of TSS 106 is described in more detail below in conjunction with FIG. 3. Briefly, however, TSS 106 may include any computing device capable of connecting to network 105 to selectively refine a search result based on a user's social network, wherein the social network or trust search results may be selectively displayed distinctly from other non-trust search results based on a query-class and the query-class's number and position for a number of trust search results to display and where within a display.

TSS 106 may aggregate social networking information, including profiles of a search user, profiles of friends, family, and so forth, along with various social activity streams across multiple trusted social networks to create a 'per user trust data source" of social networking search data. It should be understood that there may be a plurality of trust data sources for a given user.

At a time of a web search query, the search query may be classified into one or more query-classes. If a query-class for the search query includes performing searches over the trust data source, then the trust data source(s) is/are searched for trust search results. Searches over non-trust data sources are also performed. Then based on a number of trust search results and position for displaying the trust search results for the one or more query-classes, the trust search results are distinctly displayed uniquely from the non-trust search results. In one embodiment, the trust search results are uniquely identified based on their trust data source. In one embodiment, the search user may then selectively display subsets of the trust data source's trust search results. TSS 106 may employ processes such as are described below in conjunction with FIGS. 4-6 to perform at least some of its actions. Moreover, FIG. 7 below illustrates one non-limiting display of search results where trust search results are distinctly displayed from non-trust search results.

Devices that may operate as TSS 106 include various network devices, including, but not limited to personal computers desktop computers, multiprocessor systems, microprocessor-based or programmable consumer electronics, network PCs, servers, network appliances, and the like.

Although FIG. 1 illustrates TSS 106 as a single computing device, the invention is not so limited. For example, one or more functions of TSS 106 may be distributed across one or more distinct computing devices. For example, aggregating social networking data for users may be performed on one network device, while performing search queries and providing search results may be performed on another network device. However, other arrangements may also be employed.

Content servers 107-109 include virtually any network device that is configured to provide content over a network to another computing device. As such, content servers 107-109 may provide content that includes social networking content, as well as non-social networking content. Content servers 107-109 may further host a variety of social networking sites, including, but not limited to Flicker, Twitter, Facebook, LinkedIn, personal user sites, such as blogs, vlogs, online dating sites, and so forth. Content servers 107-109 may also host a variety of non-social networking sites, including, but not limited, to various business sites, educational sites, dictionary sites, encyclopedia type sites, financial sites, government sites, and the like.

Content servers 107-109 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Devices that may operate as content server 107 include personal computers desktop computers, multiprocessor systems, microprocessor-based or programmable consumer electronics, network PCs, servers, and the like.

Illustrative Mobile Client Environment

Figure 2:
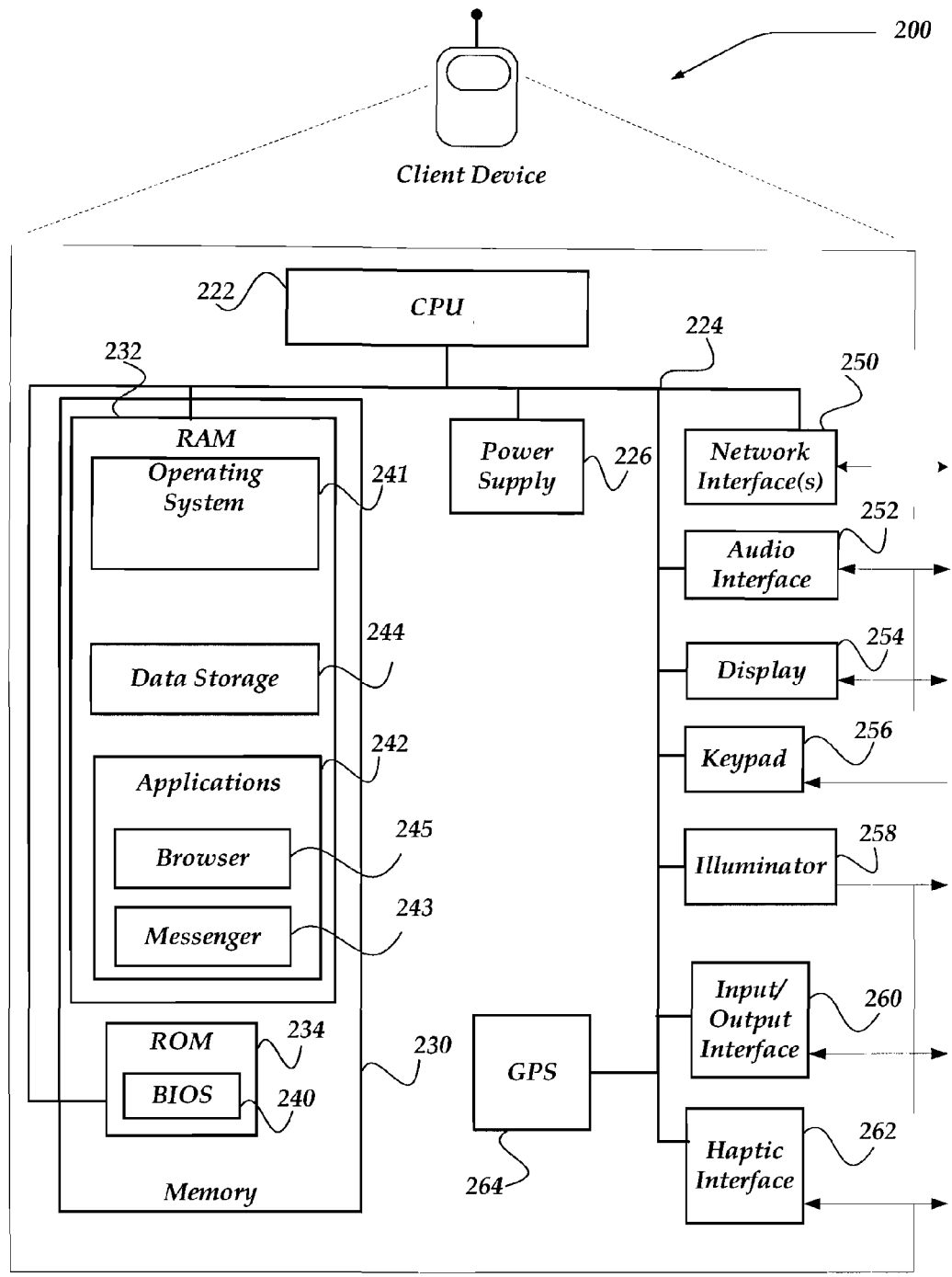
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other physical storage devices. Mass memory 230 illustrates an example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, login username/passwords, credentials, user profiles, or the like. At least a portion of the social networking information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed. Moreover, browser 245 may be employed to request various content and/or receive such content. In one embodiment, browser 245 might also be employed to perform one or more search query requests over a network, such as the Internet, or the like, and to request search results, where at least one search query request might include a request to perform a search over a defined plurality of trust data sources, as well as over one or more non-trust data sources. One non-limiting example of a display of search results that includes displaying trust search results distinct from non-trust search results is described in more detail below in conjunction with FIG. 7.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols.

Illustrative Server Environment

Figure 3:
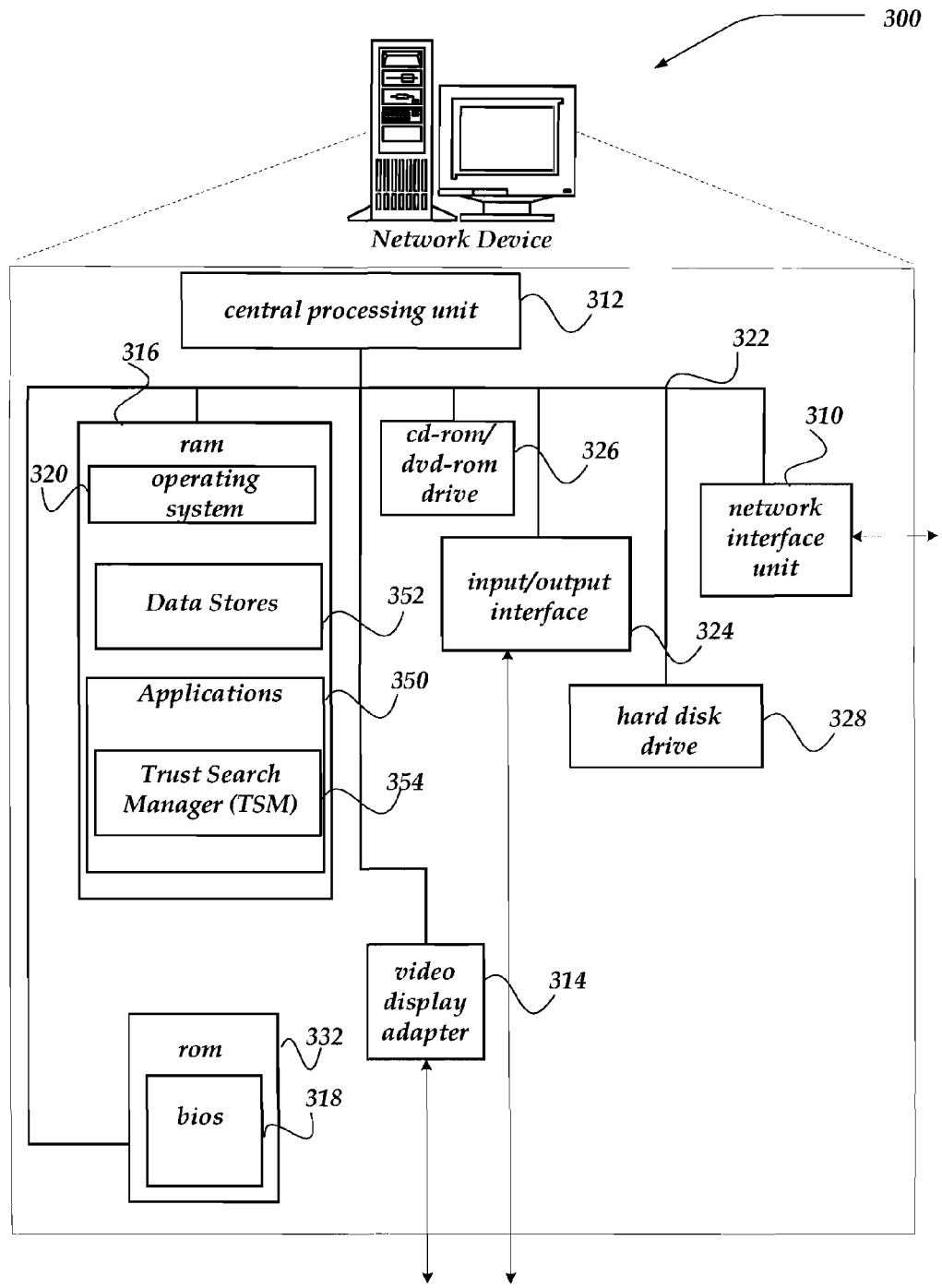
FIG. 3 shows one embodiment of a network device that may be included in a system implementing the invention.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, TSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

As shown, data stores 352 may include a database, text, spreadsheet, folder, file, or the like, that may be configured to maintain and store social networking information, including, but not limited to profile information including a user's name, identification of various social networking sites or trust data sources for which a user is a member, has an explicit connection with, or has an implicit connection, including an extended implicit connection, or the like. Data stores 352 may further include various credentials, user name/password information, and the like, useable to enable TSM 354 to access social networking information and other trust data for use in determining, among other things, trust data for use in performing search queries. Data stores may further include social networking that may be from or within a user's IM friends list, a buddy list, an address book, email history log, Twitter message log, an IM conversation log, a VOIP store, or the like. However, the contact information may also be obtained indirectly through monitoring various interactions of a user. Thus, for example, the social networking information may be extracted based on content within a message between the user and another member of a social network. For example, in one embodiment, the user and the other member may include information about a third person, or the like. Such third person information may also be obtained, in one embodiment, and stored within data stores 352. Similarly, various networking behavior of a user, or other social networking member, may also be obtained, including, for example, websites visited, types of information searched for by the user, types of content downloaded, where the content is downloaded from, or the like. Information may also be obtained from another member's social networking contact information, which may be useable when performing a search query. Data stores 352 may further include information about a plurality of query-classes, including information that is useable to determine whether a given search query is associated with one or more of the plurality of query-classes. Data stores 352 may also include information about a number and position for displaying trust search results for each of the plurality of query-classes. Data stores 352 are also store one or more web page formats, templates, or the like, useable to display various search results, provide a user interface for a user to select various trust data sources for displaying trust search results, as well as to enable a user to identify one or more trust data sources over which to also conduct trust search queries. Data stores 352 are not limited to storing merely the items identified above, and virtually any information may be stored within data stores 352, including information useable by TSM 354 for performing and/or displaying trust and non-trust search results. Moreover, while data stores 352 are illustrated with RAM 316, at least a portion of the content of data stores 352 may be stored elsewhere, including, but not limited to cd-rom/dvd-rom drive 326, hard disk drive 328, and/or even on another network device.

The mass memory also stores program code and data. One or more applications 350 are loaded into mass memory and run on operating system 320 by central processing unit 312. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Trust Search Manager (TSM) 354 may also be included as an application program within applications 350.

TSM 354 is configured to manage a search query and a display of search results by employing a query-classification for the search query to selectively display trust search results that are displayed distinct from non-trust search results for the search query. TSM 354 may classify the search query into one or more query-classes. A search is then performed over non-trust sources, and selectively over trust data sources to obtain non-trust and trust search results, respectively. The trust search results are rank ordered by TSM 354 based on various categories of search criteria, including, for example, explicit and implicit relationships, or connections. Based on the query-class(es) for the search query, a determined number of trust search results may be displayed. Further, a determined position for which the trust search results may be displayed may be based on the query-class(es). Moreover, the non-trust search results are displayed distinct or separate from the trust search results to readily distinguish a type of data source of the search results.

In one embodiment, TSM 354 may receive for a user, various login usernames/passwords, credentials or the like, for various social networking sites, and/or other social networking data sources. In one embodiment, TSM 354 may determine which social networking sites are associated with the user, based on a user profile for the user, analysis of the user's online social behaviors, messages communicated to/from the user, and the like. Social networking sties and other social networking data sources may also be determined based on various buddy lists, address books, and the like, associated with the user.

In any event, TSM 354 may store the credentials, username/passwords, and other access information for the user with the various social networking data sources, and so forth, in data stores 352. Based on some criteria, TSM 354 may perform various searches over the user's social networks, data sources, and so forth, for profiles about the user's friends, activity streams, and so forth. TSM 354 may store such profiles, activity streams, and/or other social networking data within data stores 352 for the user. Such stored results may be termed social networking data sources, trust data sources, or the like. In one embodiment, the stored results include various information indicating a source of the data, such as a club, a social networking site, a member, a friend, family member, and the like. In one embodiment, the data further includes a time stamp, or the like. In one embodiment, the results may be further organized to be accessible, and/or otherwise searchable.

When TSM 354 determines that a search query is received from a search user, TSM 354 may classify the search query into at least one query-class from a plurality of different query-classes. TSM may perform a search using the search query over a plurality of non-trust data sources to obtain a plurality of non-trust search results, and further selectively perform another search using the search query over the plurality of trust data sources determined above for the user to obtain trust search results. TSM 354 may then determine, based on the at least one query-class for the search query, a number and a position for selectively displaying the plurality of trust search results. TSM 354 may further selectively display the plurality of trust search results distinct from a display of the plurality of non-trust search results, where the selectively displayed plurality of trust search results includes information indicating a source of each trust search result within a trusted social networking source. TSM 354 may employ processes such as described further below in conjunction with FIGS. 4-6 to perform at least some of its actions.

It should be understood, that while TSM 354 may perform various searches over various data sources, such actions may also be performed by another component, such as a search engine, or the like (not shown). Thus, the configuration of network device 300, including TSM 354 is not to be construed as limiting, and other arrangements, components, and/or network devices may be employed to perform at least some of the actions of TSM 354. For example, as noted, TSM 354 might perform an analysis of a search query, send the search query to one or more search engines, where each search engine might search different data sources, receive the search results, and provide the search results for display to a search requester's client device.

Generalized Operation

The operation of certain aspects of the invention will now be described with respect to FIGS. 4-6. Moreover, FIG. 7 provides one non-limiting, non-exhaustive example of a screen display of search query results showing trust search results distinct from non-trust search query results. Such example may be employed to illustrate various aspects described further within the present disclosure.

Figure 4:
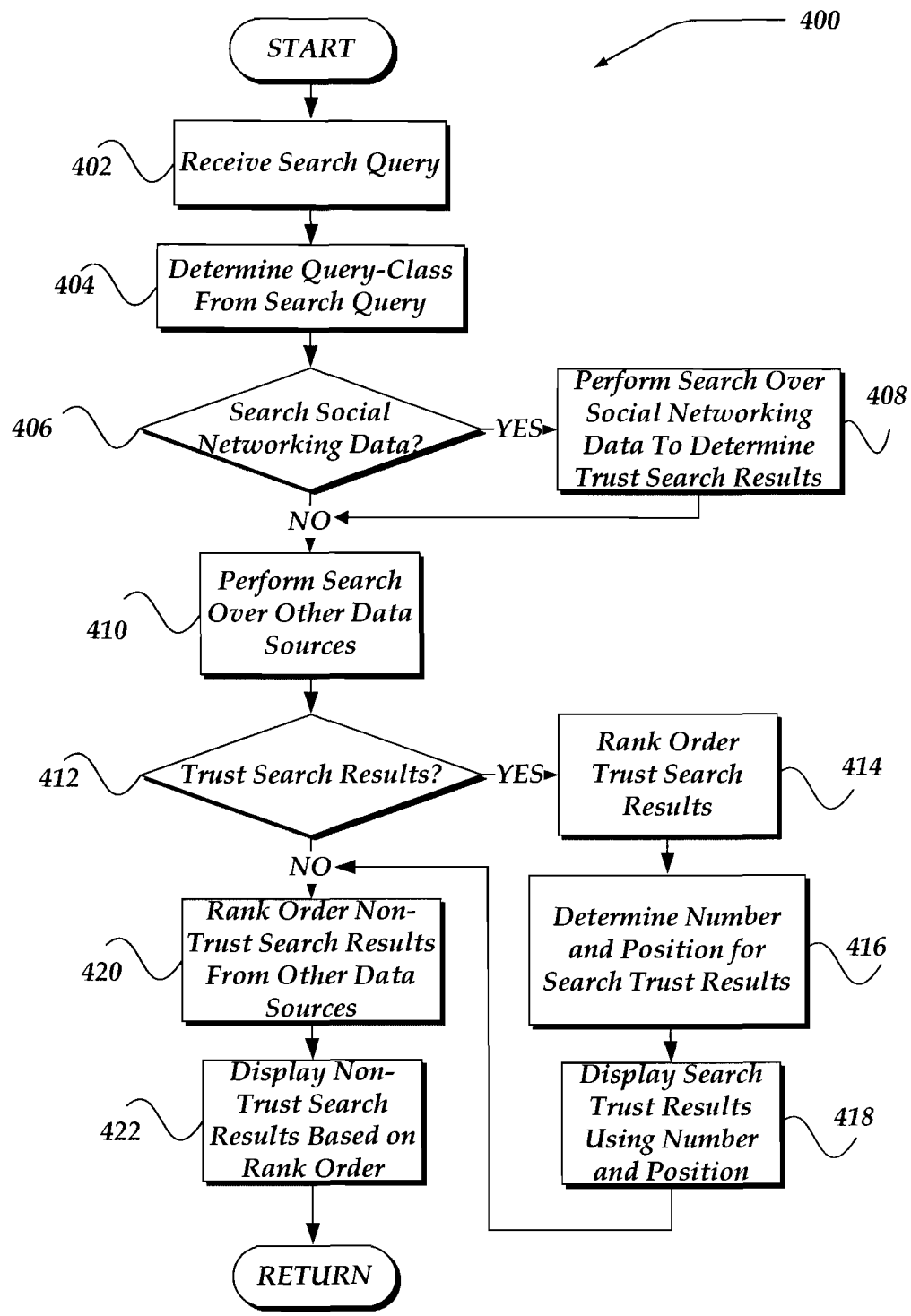
FIG. 4 illustrates a logical flow diagram generally showing one embodiment of an overview process of performing and displaying search results that selectively include trust search results that are displayed distinct from non-trust search results based on a query-class.

FIG. 4 illustrates a logical flow diagram generally showing one embodiment of an overview process of performing and displaying search results that selectively include trust search results that are displayed distinct from non-trust search results based on a query-class. Process 400 of FIG. 4 may be performed within network device 300 of FIG. 3, for example.

Process 400 begins, after a start block, at block 402, where a search query is received from a client device. In one embodiment, also received may be various information that is useable to indicate a user associated with the search query. Such various information might include, but is not limited to a user identifier, a client device identifier then useable to identify the likely user, or the like.

Processing continues next to block 404, where the search query is analyzed to classify the search query into one or more query-classes. Various mechanisms may be used to classify the search query, and thus, the process is not limited to a particular mechanism. For example, in one embodiment, keywords from the search query might be extracted and used to match keywords associated with one or more defined query-classes. However, because typical search queries are short, such mechanisms might result in insufficient classifications. Therefore, other mechanisms might also be used, or employed in place of keyword extractions. For example, various query-enrichment based mechanisms might be employed, which might start by enriching the search query with a collection or textual documents through various search engines. That is, the search query might be represented by a pseudo-document that includes snippets of pages resulting from various searches. The pseudo-document may then be classified into one or more of the defined query-classes using a synonym based classifier, statistical classifiers, or the like, including, for example, a Naive Bayes mechanism, a Support Vector Machine, or the like.

Other classification mechanisms may also be used, including, for example, query-clustering mechanisms. For example, logs of the user's previous search behaviors may be recorded and analyzed to identify search results for a given search query that the user clicked on. That is, an attempt may be made to associate related queries by clustering previous search data, which contains multiple queries and click-through information from the user's previous activities. In one embodiment, the query clustering mechanism may be combined with the keyword mechanism above to classify the search query into one or more query-classes.

In any event, processing flows next to decision block 406, where the classifications into one or more query-classes is then employed to determine whether to perform a search over trust data sources (e.g., search various social networking data sources identified as being trusted by the user, as noted above). It is recognized that while some search queries might benefit from such social networking data search results, others might have significantly less of a benefit. Thus, search queries that might be classified as pure factual type of search queries might have a less benefit from social networking data source search results than, for example, search queries that seek social input, such as search queries seeking reviews, seeking opinions, seeking activity oriented information, or the like. Thus, one or more query-classes may be associated with social search queries, while others might be associated with non-social search queries. As a non-limiting, non-exhaustive example, and as noted above, factual search queries might be non-socially oriented, while activity, opinion, and review based search queries may be considered as socially oriented query-classes. Thus, at decision block 406, the query-classes for which the search query is classified into are examined to determine whether at least one of the query-classes would be considered as a socially oriented query-class. If so, then processing flows to block 408; otherwise, processing flows to block 410.

At block 408, a search using the search query is performed over the plurality of trust data sources identified for the user to determine trust search results. Processing then flows to block 410, where another search using the search query is performed over a plurality of non-trust data sources. Such non-trust data sources may include proprietary databases, various non-trusted (for the user) web sites, and the like. In one embodiment, such non-trust data sources might include virtually any website accessible over the Internet that is determined for this user to be other than a trust data source.

Processing continues next to decision block 412, where another determination is made whether there are trust search results obtained for this search query. If so, processing flows to block 414; otherwise, processing continues to block 420.

At block 414, the trust search results may be rank ordered. In one embodiment, the trust search results may be organized based on a category from which the trust search results were obtained. For example, the trust search results might be obtained from explicit connections, implicit connections, and/or extended implicit connections, as described above. Thus, in one embodiment, the trust search results might be organized based on these or other categories. In one embodiment, trust search results might then be weighted based on their respective category. For example, trust search results in the explicit category might be weighted numerically higher than trust search results in the implicit category, and further implicit categorized trust search results might be weighted numerically higher than trust search results in the extended implicit category.

The weighted results might further be weighted based on a number of updates, or results associated with a particular data source. For example, in one embodiment, a predefined number of trust search results might be used from a particular source, such as a family member, co-worker, or the like. For example, in one embodiment, 1000 update results from a particular family member might be used, while any additional results from the same particular family member might be discarded. In this manner, search results might be used that are not 'time dependent.' However, in another embodiment, search results might be limited or otherwise restricted based on a time constraint, such as retaining only those search results that were posted by a particular data source within a previous defined time period. Thus, the invention is not constrained to a particular mechanism for managing, sorting, and/or weighting the trust search results. In any event, the weighted and/or limited trust search results may then be rank ordered based on the weightings.

Processing then flows to block where a number and position is determined for use in determining how many trust search results to be displayed and where to display the trust search results with respect to non-trust search results. As described further below in conjunction with FIG. 6, each query-class has a determined 'optimal' number and position for displaying the trust search results. Where a search query is classified into a plurality of different query-classes, however, the trust search results might then have different numbers and positions for which the trust search results may be associated. Several mechanisms may be used to resolve this issue. For example, in one embodiment, a largest number and highest position among the possible numbers and positions may be selected for the query-classes for which the search query is classified into. Other approaches may also be used. Thus, the invention is not limited to a particular mechanism. In any event, the number and position for trust search results is determined.

Processing continues next to block 418, where the determined number of rank ordered trust search results may then be displayed at a client device, at the determined position relative to non-trust search results. Thus, in one embodiment, while block 418 is illustrated distinct from block 422, discussed below, the invention is not so constrained. For example, blocks 418 and 422 may be performed concurrently, in one embodiment.

In any event, processing flows to block 420, where the non-trust search results from the non-trust data sources may also be rank ordered based on a variety of criteria, including, for example, a number of keyword matches to the search query's keywords, a time relationship, a relationship based on a location associated with a non-trust search result to the user, or the like. Processing then flows to block 422, where the rank ordered non-trust search results (and the trust search results) are displayed to the client device for the search user. One non-limiting example of such a display is described further below in conjunction with FIG. 7. Processing then returns to a calling process to perform other actions.

Figure 5:
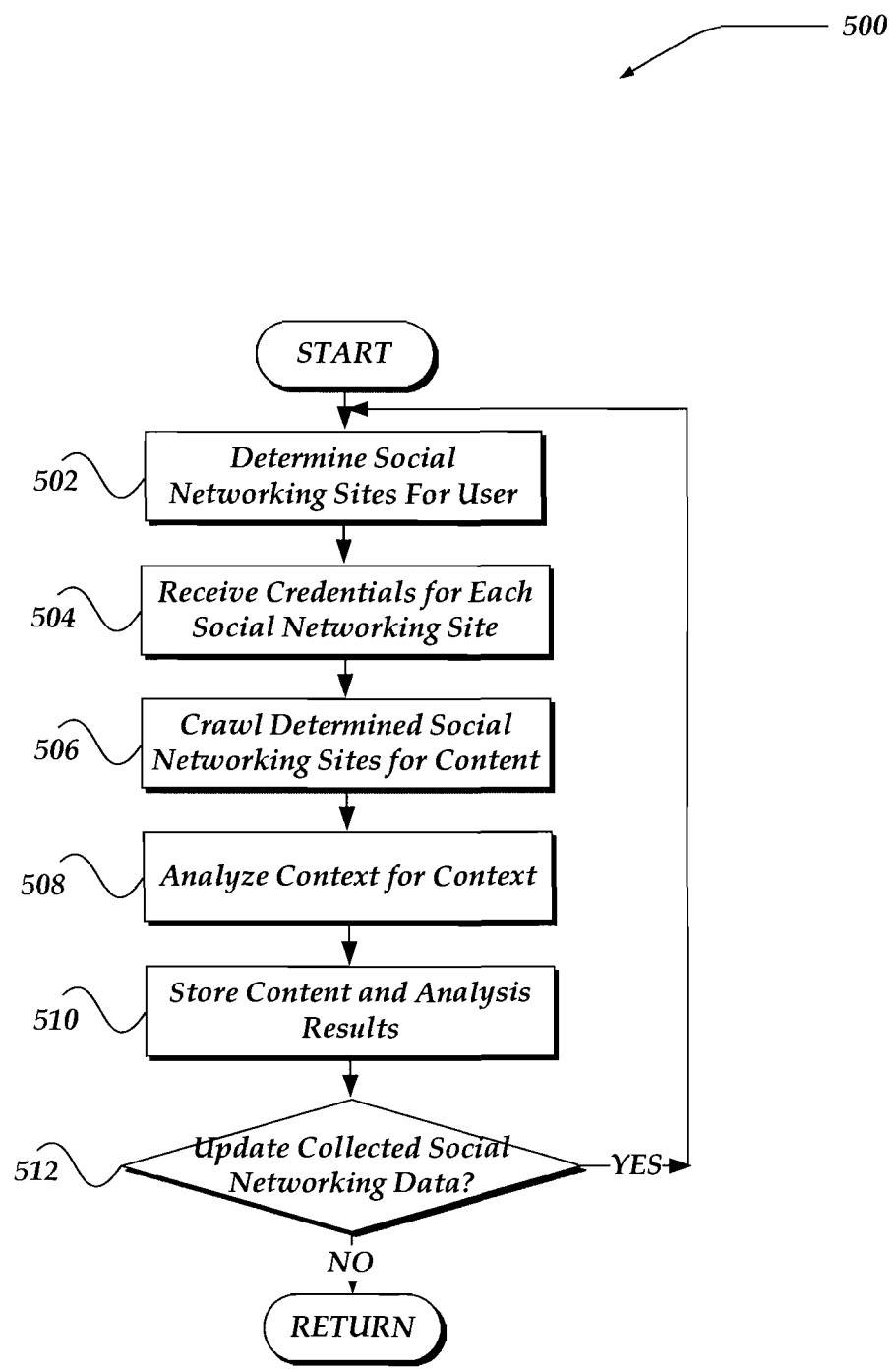
FIG. 5 illustrates a logical flow diagram generally showing one embodiment, of an overview process of managing trust content from social network sites for a user.

FIG. 5 illustrates a logical flow diagram generally showing one embodiment, of an overview process of managing trust content from social network sites for a user. In one embodiment, the results of process 500 of FIG. 5 may be used to generate trust data stores on a per user basis that may then subsequently searched during, for example, block 408 of FIG. 4. Thus, process 500 may be implemented within network device 300 of FIG. 3, for example.

Process 500 begins, after a start block at block 502, where social networking sites, activity streams, and the like, are determined for a user. In one embodiment, a default set of social networking sites might be used. For example, in one embodiment, the default set may include, but not be limited to Twitter, Facebook, LinkedIn, or the like. However, in another embodiment, the user may provide a list of preferred social networking sites, activities, or the like, to be used for conducting searches. In still another embodiment, online activities, address books, buddy lists, calendars, user profiles, activities detected based on a location of the user's mobile device, and so forth might also be monitored and analyzed to determine a set of social networking sites, or the like, for the user.

In any event, processing flows next to block 504, where various credentials, user name/passwords, and other login access information may be obtained for use in crawling the various social networking sites, and so forth. Processing then proceeds to block 506, where the set of social networking sites may be crawled, using the login access information, in search for various social networking activities, profiles, profiles of friends, activity streams, and so forth. For example, for Twitter, a direct API may be made available that may be used to obtain profiles of friends, activity streams, including message threads, blog information, postings, and the like. For Facebook, LinkedIn, or the like, a browser action might be simulated using, for example, an HTTPUnit library, or the like, for form-filling to crawl various sites, activities, and so forth.

Flowing to block 508, from the crawling activities, various pages, profiles, activity stream information, and so forth may be extracted by, for example, examining, specific HTML tags, keywords, or the like, in the crawled content. It should be understood, however, the other mechanisms may also be used to examine the content to determine a context of the content, and other social information. In one embodiment, the amount of information that may be collected and/or then subsequently stored during block 510 in a plurality of trust data stores, may be based on various criteria, including but not limited to an amount of data for a given data source, a time stamp associated with the data, or the like. For example, in one embodiment, a last 1000 updates produced by a person might be collected, analyzed, and stored in a trust data store. Other quantities may also be collected, analyzed, and stored. In another embodiment, updates not older than a defined time period, such as an hour, day, week, or the like, might be used. In any event, at block 510, the collected and/or analyzed data may be stored in the plurality of trust data stores based on a data source, a time stamp, keywords, or other organizational mechanism. In one embodiment, the stored data is on a per user basis. Processing then flows to decision block 512, where a determination is made whether to continue to collect more social networking data for the user. In one embodiment, data collection may be based on a time period, such as hourly, daily, weekly, monthly, or the like. In another embodiment, the data collection may be based on some other criteria. For example, where it is determined that the user is performing a number of searches above a threshold, where the searches may benefit from current social networking data, then, process 500 might be performed more frequently. In one embodiment, where it is determined that various data sources for the user are very active in sending messages, posting content, or the like, that is above some other threshold, then process 500 might also be performed more frequently. Thus, how often data collection is performed may be set to some default, and/or modified based on some criteria. In any event, if it is determined that more social networking data is to be obtained, then processing loops back to block 502. It should be noted, in one embodiment, the trust data stores may also include a phase out mechanism for aging data. That is, social networking data collected prior to some time period, might be aged or otherwise phased out, as being considered to be out of date, and therefore less relevant to a user. Various aging or phase out mechanisms may be employed, and therefore, the invention is not limited to a particular mechanism. In any event, if it is determined that no more social networking data is to be obtained, then process 500 may return to a calling process to perform other actions.

Figure 6:
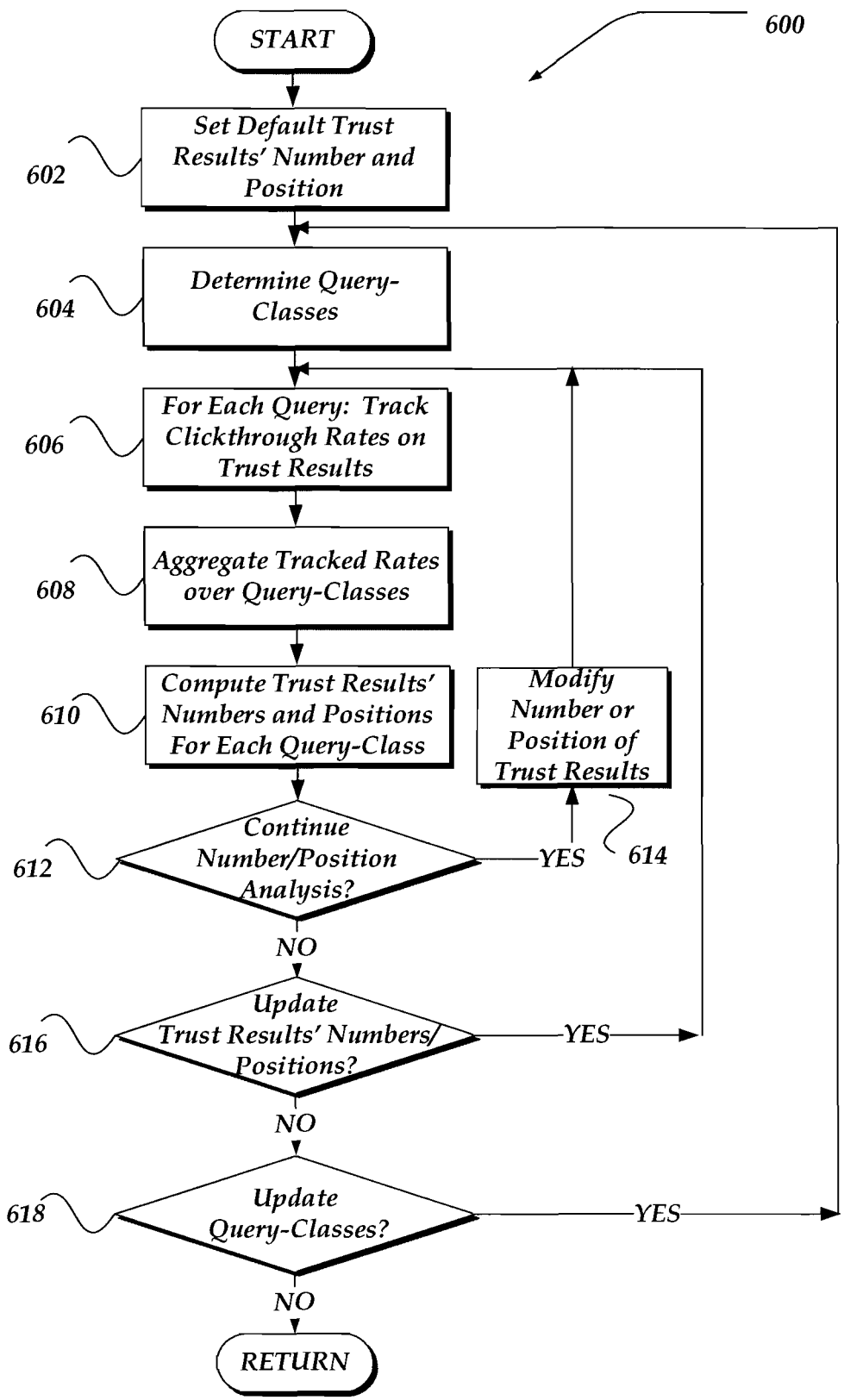
FIG. 6 illustrates a logical flow diagram generally showing one embodiment, of an overview process of determining query-classes and associated numbers and positions for selectively displaying trust search results from a search query distinct from non-trust search query results.
Figure 7:
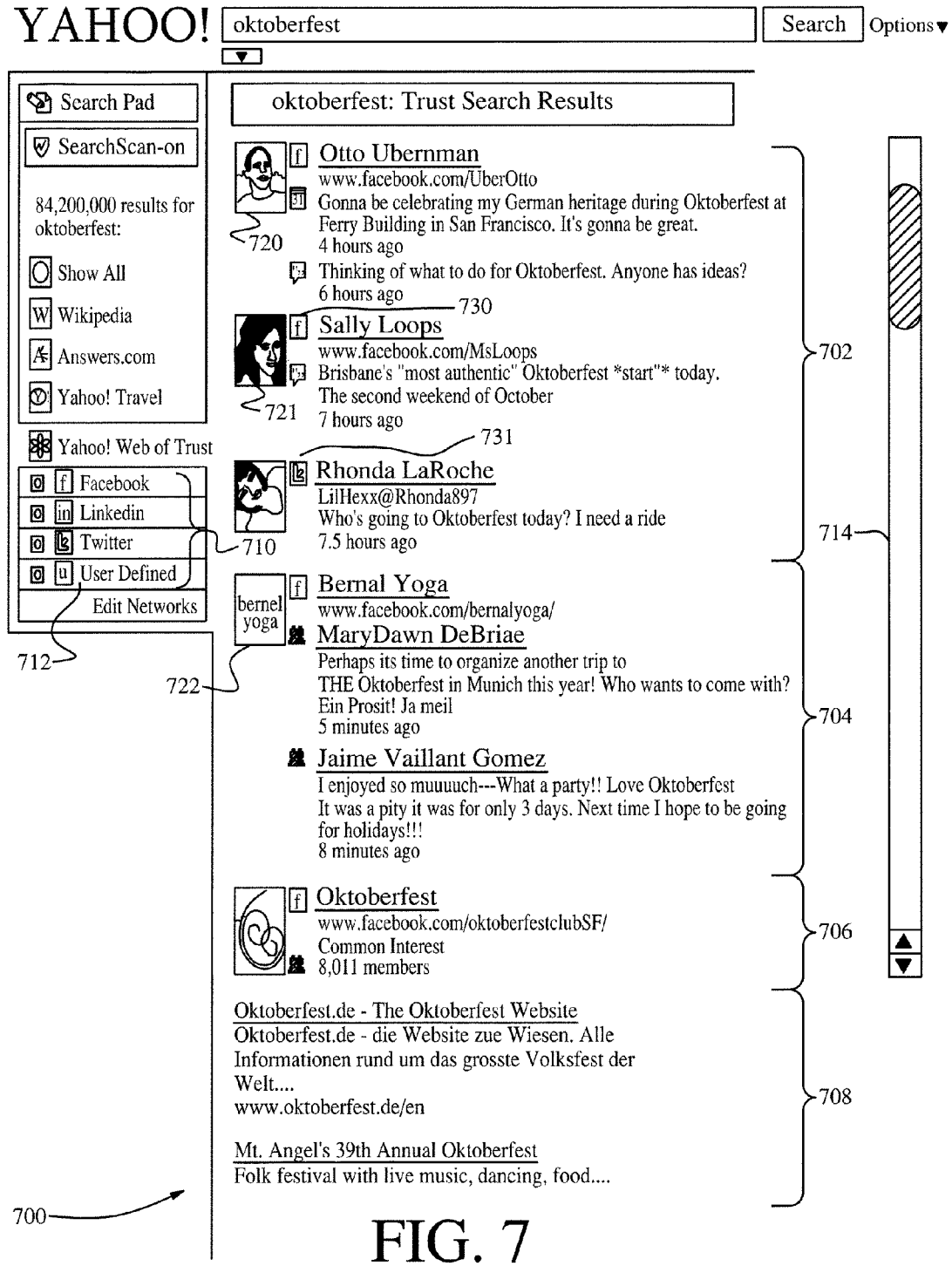
FIG. 7 illustrates one non-limiting, non-exhaustive example of a screen display of search query results showing trust search results distinct from non-trust search query results.

FIG. 6 illustrates a logical flow diagram generally showing one embodiment, of an overview process of determining query-classes and associated numbers and positions for selectively displaying trust search results from a search query distinct from non-trust search query results. Process 600 of FIG. 6 may be implemented within network device 300 of FIG. 3, in one embodiment.

As noted above, there are several types of queries for which social networking search results may provide less interest or benefit to a search user than other non-social networking search results. For example, for factual queries, such as "what is the capital of California?," or "target Sunnyvale address?" or "what is the population of China?" or the like, a search user may not want to see social networking search results. This is simply because the search user may actually be seeking information that typically doesn't change based on a user's social network. Therefore, providing social networking or trust search results to these types of queries, might actually provide less value to the search user, or even result in dissatisfaction. However, for other types of queries, social networking search results may be determined to provide more relevancy to the search user. For example, for review queries, such as "tell me about movie X?," or product reviews, or the like, may benefit from social networking search results. Similarly, activity queries may also have benefit from social networking search results. Examples of activity queries might include "weekend," "skiing in Tahoe," "mountain biking," or the like. Thus, whether to provide social networking search results, and/or how much to provide may be based on a type or classification of query.

Therefore, process 600 is directed towards determining a number of social networking results that might be shown based on a given query-class. Moreover, because some social networking results might be more relevant given a particular query-class than other non-trust search results, where the trust search results might be displayed on a webpage in relation to the non-trust search results is also determined by process 600.

Thus, process 600 begins, after a start block at block 602, where a default number of trust results and a default position for displaying the trust results are set. In one embodiment, the defaults may be set substantially independent of a query-class. Thus, for example, for any query-class that is it is determined that trust search results are to be displayed (e.g., excluding factual query classes) then a maximum number of 2-4 trust search results might be displayed by default. However, other values may also be selected. In one embodiment, the position of the trust search results may be set to default as the first search results to be displayed on a first page of the search results for a web page. Thus, a default, the 2-4 trust search results may be displayed first, followed by non-trust search results.

Moreover, in one embodiment, the trust search results may be distinctly and uniquely identified as being from trust data sources for the user. Various mechanisms may be used to distinctly and uniquely identify the trust search results, including, but not limited to placing a box around the results, uniquely labeling the trust search results, employing a different color, font size, font type, providing a trust data source icon, or the like. In one non-limiting example, as shown in FIG. 7, trust data source icons 720-722, and 730-731 are illustrated to uniquely distinguish and uniquely identify that the illustrated search results are trust search results, and further identifying their trust data sources. As may be seen, the non-trust search results 708 of FIG. 7 do not include such trust data source icons.

In any event, returning to process 600, at block 604 a plurality of query-classes are determined. The determination of the plurality of query-classes may be achieved using any of a variety of mechanisms, including statistical analysis of a plurality of online behaviors, various dictionary analysis mechanisms, or the like. In one embodiment, each of the query-classes are further identified at least as being a non-trust based query-class or being a trust based query-class, such as discussed above for factual, review based, and activity based examples.

It should be noted, that while block 602 identified default numbers and positions for trust based query-class searches, the invention is not limited to performing such actions prior to determining the plurality of query-classes. For example, the default number and positions may be further refined during block 604. For example, at block 604, non-trust based query-classes, the number and position may be set to zero for both. For a review query-class, the default number might be set to 3-7; while activity based query-classes might have a default number set to 3-5, or the like. Similarly, for review query-class, a default position might be zero (or one)—reflecting that the trust search results are illustrated before or above the non-trust search results. For other query-classes different positions may be used, including setting the default at four—to display the trust search results in a middle of a web page, between non-trust search results, or even at a position, such as 11 or the like, that positions the trust search results at a bottom of a first page of search results. Other values may also be selected. Moreover, it should be noted that while only activity and review-based query-classes are discussed herein, the invention is not limited to merely these query-classes and others may also be used.

In any event, processing then flows to block 606, where an analysis is performed to determine based on a plurality of user feedback for each of the determined query-classes what an optimal number and position for displaying the trust search results might be. As used herein, the term "optimal" refers to an output that satisfies a given test or tests, such as described below.

Thus, for each query-class, various trust and non-trust search results are displayed to a plurality of different search users. Monitoring is then performed to determine various clickthrough rates for the displayed trust and non-trust search results. At block 608, the tracked clickthrough rates are aggregated and at block 610, the aggregated rates for each query-class are used to compute al number and position. Continuing to decision block 612, a determination is made whether to continue the analysis based on whether an optimal number and position is determined. If an optimal number and position is undetermined, processing may loop to block 614, where a number and/or position value may be adjusted. Processing then loops back to block 606 to continue collecting clickthrough rates for analysis. If at decision block 612, an optimal number and position is determined, processing flows to decision block 616.

At decision block 616, a determination is made whether to update the number or position for a query-class. If so, processing loops back to block 606; otherwise, processing flows to decision block 618.

At decision block 618, a determination is made whether to modify the determined plurality of query-classes. Such determination may be based on a variety of criteria, including additional analysis of the existing query-classes, user feedback, or the like. In any event, if the determined plurality of query-classes are to be updated, processing loops back to 604; otherwise, processing returns to a calling process to perform other actions.

As described above, process 600 may be performed concurrently to determine both the number and position for a query-class. However, in another embodiment, process 600 may loop first to determine, for example, a number of trust search results for a query-class, and then loop again to determine a position for the query-class. Thus, for example, the following represents a refinement to process 600, and in particular blocks 606, 608, 610, 612, and 614.

In another embodiment, the position may be determined first. To start with, a display of might show only one trust search result for a given query class at a fixed position, such as position N. In one embodiment, N might be four—to display the trust search results in a middle of a web page of search results, for example.

Then, if it is determined based on the tracked clickthrough rates that a search result at position N+1 is receiving more clicks than a trust search result at position N, then it may be determined that users are valuing position N+1 more than the trust search result's position. Therefore, the trust search result's position is modified (block 614), to move the trust search result down in the page display by one position. Now, the trust search result is displayed in position N+1. Looping back through blocks 606, 608, and 610, additional clickthrough rates are obtained with the trust search result in N+1 position, with the non-trust search results in positions N+2, and the like. In one embodiment, analysis may indicate that the trust search results may be pushed down further if clickthrough rates at position N+2 are greater than the clickthrough rates for the trust search result displayed at position N+1.

On the other hand, if the non-trust search result at position N−1 is determined to have a lower clickthrough rate than the trust search result at position N, then it may be determined that the trust search result is more valuable for the user and should be moved upwards in a displayed position on the web page, such as to position N−1. The above modifications and tracking of clickthrough rates may be performed over a plurality of loops until it is determined at decision block 612, that a position K is determined for the trust search result, such that the clickthrough rates on non-trust search results at position K−1 is greater than the clickthrough rate of the trust search result at position K, which in turn is greater than the clickthrough rate for a non-trust search result at position K+1. If so, then processing may then proceed to determine a number of trust search results to be displayed starting at the determined optimal position K.

Thus, after determining the position K, the process may begin by displaying N trust search results. In one embodiment, N might be set initially at three, again, starting at position K, as determined above. Other values for N may also be selected.

Processing the flows to block 606 where clickthrough rates are collected, block 608 where they are aggregated, and block 610, where the following analysis may be performed. If the clickthrough rate on the Nth trust search result is determined to be greater than the clickthrough rate of a search result at the next position, then it may be determined that the Nth trust search result is more valuable to the searchers than a next search result at a next position. Therefore, at block 614, the number of trust search results displayed may be increased to N+1. If the clickthrough rate on the Nth trust search result is less than that of the search result at the next position, then it may indicate that the trust search result at position N is not as valuable to searchers as a next search result. Therefore, the number of trust search results may be decreased to N−1. Again, these actions may be performed until it is determined that the number N of trust search results is such that the clickthrough rates of the trust search results at position N is greater that that of a next search result displayed, and where if the number of trust search results is increased to N+1, the clickthrough of the N+1th trust search result is less than that of the next search result. If so, then the optimal number of trust search results may be determined as N, for the given query-class.

It should be understood that other mechanisms may also be used to determine a number and position for a given query-class, and the invention is not limited to a particular approach.

In any event, as noted at decision block 616, updates to the number and/or position for a given query-class may be performed periodically, such as every couple of months, weeks, or the like, to tune the values based on changes in searcher perspectives, changes in social and/or other events, and the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Non-Limiting Example of Search Results with Trust Search Results

FIG. 7 illustrates one non-limiting, non-exhaustive example of a screen display of search query results showing trust search results distinct from non-trust search query results. Display 700 may include many more or less components than those shown in FIG. 7. However, the components shown are sufficient to disclose an illustrative embodiment for practicing the present invention.

As illustrated in display 700, search results for a given search query are displayed. In particular, trust search results 702, 704, and 706 are displayed above and distinct from non-trust search results 708. That is, as shown in FIG. 7, trust data source icons 720-722, and 730-731 are illustrated to uniquely distinguish and uniquely identify that the illustrated search results are trust search results, and further identifying their trust data sources. As may be seen, the non-trust search results 708 of FIG. 7 do not include such trust data source icons.

As is further shown, the trust search results illustrate trust search results 702 as results obtained from various explicit connections for the search user. Trust search results 704 represent results obtained from various implicit connections for the search user, and trust search results 706 represent results obtained from various extended implicit connections. That is, trust search results 706 represents results from a group determined to be relevant to the search query, but for which the search user is not a member of. However, a first degree of separation person to the user might be a member of the group. Thus, as displayed, trust search results 702, 704, and 706 may be rank ordered based on a trust data source—e.g., explicit higher than implicit, higher than extended implicit. Moreover, in one embodiment, the trust search results 702, 704, and 706 may be sorted and rank ordered within each grouping based on a time/date stamp. Of note, five trust search results are displayed starting at a top position of the web page for displaying the search results. However, for a different query-class the number and position may be different. Thus, the invention is not limited by the number and position displayed in FIG. 7.

While in one embodiment, the number and position may be used to place the trust search results, other techniques may also be used to enable additional numbers of trust search results to be displayed. For example, in one embodiment, optional slider 714 might be used for reviewing the trust search results independent of non-trust search results 708. In this manner, a larger number of trust search results may be made available for a given position on a web page.

Also illustrated in display 700 are trust data sources 710. Other trust data sources may be displayed. Also noted, is trust data source 712, which represents a user definable trust data source. It should be noted that while only a single user definable trust data source is illustrated, the invention is not so limited and more trust data sources might be added by the user.

In one embodiment, the search user may select any or all of the displayed trust data sources 710, such that those that are not selected would result in removing their respective trust search results from display 700. For example, should the searcher deselect the Facebook trust data source, then the respective trust search results obtained and displayed in trust search results 702, 704, and 706 would be removed from the display. In one embodiment, trust search results from selected trust data sources would then be added to the displayed list based on the determined optimal number for the given query-class.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device comprising:
   a transceiver to send and receive data over the network; and
   a processor configured to execute computer instructions, the instructions comprising the steps of:
   receiving a search query from a search user;
   classifying the search query into at least one query-class from a plurality of query-classes;
   performing a search using the search query over a plurality of non-trust data sources to obtain a plurality of non-trust search results;
   selectively performing another search using the search query over a plurality of identified trust data sources to obtain a plurality of trust search results, wherein the identified trust data sources include explicit trusted data sources that are trusted specifically by the search user and wherein the non-trust data sources are non-trusted specifically by the search user;
   categorizing the plurality of trust search results based on the search user's respective relationship with each identified trust data source, the search user's respective relationship being one from a group of relationships comprising an explicit trust data source relationship, an implicit trust data source relationship, and another trust data source relationship having a correspondence with a social networking source for which the search user is not a member;
   determining, based on the at least one query-class for the search query and the trust search results categorization, a number and a position for selectively displaying each of the plurality of trust search results in a rank order; and
   selectively displaying the plurality of trust search results distinct from a display of the plurality of non-trust search results, wherein the selectively displayed plurality of trust search results is in accordance with the determination and includes display of information indicating an identified trust data source of each of the plurality of trust search results.

2. The network device of claim 1, wherein the plurality of query-classes include at least one of a factual query-class, a reviews query-class, and an activity query-class, and wherein, if it is determined that the search query is a factual query-class, inhibiting display of the trust search results.

3. The network device of claim 1, wherein the search user is provided a user interface for selectively displaying subsets of the plurality of trust search results based on an identified trust data source from which a trust search result is associated.

4. The network device of claim 1, wherein each query-class has a number and position for selectively displaying the plurality of trust search results, and where in the number and position for each query-class is determined by:
  tracking a plurality of clickthrough rates from a plurality of search query users over a plurality of trust results;
  aggregating tracked clickthrough rates over each of the plurality of query-classes; and
  determining an optimal number and position for each of the plurality of query-classes using search query users' feedback that indicates a number and position for which a most frequent number of selections are made as indicated in part by the aggregated tracked clickthrough rates.

5. The network device of claim 1, wherein the plurality of identified trust data sources comprises at least one of a plurality of social networking websites, or a plurality of messages from at least one of a friend or family member to the search user.

6. A system comprising:
  at least one computing device comprising a memory to store instructions and further comprising one or more processors to execute the instructions to:
    receive a search query from a search user;
    classify the search query into at least one query-class from a plurality of query-classes;
    perform a search using the search query over a plurality of non-trust data sources to obtain a plurality of non-trust search results;
    selectively perform another search using the search query over a plurality identified trust data sources to obtain a plurality of trust search results, wherein the identified trust data sources include explicit trusted data sources that are trusted specifically by the search user and wherein the non-trust data sources are non-trusted specifically by the search user;
    categorize the plurality of trust search results based on the search user's respective relationship with each identified trust data source, the search user's respective relationship being one from a group of relationships comprising an explicit trust data source relationship, an implicit trust data source relationship, and another trust data source relationship having a correspondence with a social networking source for which the search user is not a member;
    determine, based on the at least one query-class for the search query and the trust search results categorization, a number and a position for selectively displaying each of the plurality of trust search results in a rank order; and
    selectively display the plurality of trust search results distinct from a display of the plurality of non-trust search results, wherein the selectively displayed plurality of trust search results is in accordance with the determination and includes display of information indicating an identified trust data source of each of plurality of trust search results.

7. The system of claim 6, wherein the plurality of query-classes include at least one of a factual query-class, a reviews query-class, and an activity query-class, and wherein, if it is determined that the search query is a factual query-class, inhibiting display of trust search results.

8. The system of claim 6, wherein the search user is provided a user interface for selectively displaying subsets of the plurality of trust search results based on an identified trust data source from which a trust search result is associated.

9. The system of claim 6, where in each query-class has a determined position for selectively displaying the plurality of trust search results, and wherein the position for a query-class is determined by:
  (a) displaying within a default position a trust search result with a plurality of non-trust search results for each of a plurality of different search queries for the same query-class;
  (b) collecting clickthrough rates from a plurality of search users for the displayed a trust search result and the plurality of non-trust search results;
  (c) based on an evaluation of the collected click through rate selectively changing the position of display of the trust search result either higher or lower with respect to at least one of the displayed plurality of non-trust search results; and
  (d) repeating steps a) through c) until a position K is determined for display of the trust search result, such that a clickthrough rate for a non-trust search result at position K−1 is greater than a clickthrough rate for the displayed trust search result at position K, which in turn is greater than a clickthrough rate for another non-trust search result at position K+1.

10. The system of claim 9, wherein the query-class further has a determined number of trust search results within the plurality of trust search results to be displayed with the non-trust search results, the number of trust search results being determined by:
  (a) displaying a default number of trust search results from the plurality of trust search results at the determined position K with a display of a plurality of non-trust search results for each of a plurality of different search queries for the same query-class;
  (b) collecting other clickthrough rates from a plurality of search users for the displayed trust search results and the displayed plurality of non-trust search results;
  (c) based on an evaluation of the collected other clickthrough rates selectively changing the number of trust search results; and
  (d) repeating steps a) through c) until a number N is determined for the trust search results, wherein the number N is determined such that a clickthrough rate for a displayed search result at position N is greater than a clickthrough rate of a next displayed search result, and where if the number N is increased to N+1 for the trust search results displayed, a clickthrough rate for an N+1 trust search result is less than another next displayed search result.

11. The system of claim 6, wherein the plurality of identified trust data sources comprises at least one of a plurality of social networking websites, or a plurality of messages from at least one of a friend or family member to the search user.

12. A method comprising:
  receiving, by a processor, a search query from a search user;
  classifying, by the processor, the search query into at least one query-class from a plurality of query-classes;
  performing, by the processor, a search using the search query over a plurality of non-trust data sources to obtain a plurality of non-trust search results;
  selectively performing, by the processor, another search using the search query over a plurality of identified trust data sources to obtain a plurality of trust search results, wherein the identified trust data sources include explicit trusted data sources that are trusted specifically by the search user and wherein the non-trust data sources are non-trusted specifically by the search user;

categorizing, by the processor, the plurality of trust search results based on the search user's respective relationship with each identified trust data source, the search user's respective relationship being one from a group of relationships comprising an explicit trust data source relationship, an implicit trust data source relationship, and another trust data source relationship having a correspondence with a social networking source for which the search user is not a member;

determining, by the processor and based on the at least one query-class for the search query and the trust search results categorization, a number and a position for selectively displaying each of the plurality of trust search results in a rank order; and selectively displaying, by the processor, the plurality of trust search results distinct from a display of the plurality of non-trust search results, wherein the selectively displayed plurality of trust search results is in accordance with the determination and includes display of information indicating an identified trust data source of each of the plurality of trust search results.

13. The method of claim 12, wherein the plurality of query-classes include at least one of a factual query-class, a reviews query-class, and an activity query-class, and wherein, if it is determined that the search query is a factual query-class, inhibiting display of trust search results.

14. The method of claim 12, wherein the search user is provided a user interface for selectively displaying subsets of the plurality of user search results based on an identified trust data source from which a trust search result is associated.

15. The method of claim 12, wherein each query-class has a number and position for selectively displaying the plurality of trust search results, and wherein the number and position for each query-class is determined by:
 tracking a plurality of clickthrough rates over a plurality of trust results;
 aggregating tracked clickthrough rates over each of the plurality of query-classes; and
 determining an optimal number and position for each of the plurality of query-classes using an optimization mechanism based on the aggregated tracked clickthrough rates.

16. The method of claim 12, wherein the plurality of identified trust data sources comprises at least one of a plurality of social networking websites, or a plurality of messages from at least one of a friend or family member to the search user.

17. The method of claim 12, wherein the plurality of trust search results is sorted based on a defined number of updates of information provided for a given identified trust data source.

\* \* \* \* \*